US008094545B2

(12) United States Patent
Suh

(10) Patent No.: US 8,094,545 B2
(45) Date of Patent: Jan. 10, 2012

(54) RECORDING MEDIUM, AND METHOD AND APPARATUS FOR RECORDING DATA IN THE RECORDING MEDIUM

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 821 days.

(21) Appl. No.: 11/224,240

(22) Filed: Sep. 13, 2005

(65) Prior Publication Data

US 2006/0077879 A1 Apr. 13, 2006

Related U.S. Application Data

(60) Provisional application No. 60/608,901, filed on Sep. 13, 2004.

(30) Foreign Application Priority Data

Jan. 26, 2005 (KR) ........................ 10-2005-0007014
Mar. 22, 2005 (KR) ........................ 10-2005-0023460

(51) Int. Cl.
*G11B 7/00* (2006.01)

(52) U.S. Cl. .................... 369/275.4; 369/47.27; 369/94; 369/275.1

(58) Field of Classification Search ........................ None
See application file for complete search history.

(56) References Cited

U.S. PATENT DOCUMENTS 7,123,557 B2 * 10/2006 Heemskerk et al. ........ 369/47.19
7,272,088 B2 * 9/2007 Yoshida et al. ............ 369/47.51
7,286,454 B2 * 10/2007 Lee ............................ 369/47.53
2002/0150012 A1 10/2002 Hsiao et al.
2003/0214900 A1 * 11/2003 Shim et al. ................. 369/275.3
2003/0227846 A1 * 12/2003 Lee et al. ................... 369/53.21
2004/0156291 A1 8/2004 Heemskerk et al.
2005/0078578 A1 4/2005 Sasaki

FOREIGN PATENT DOCUMENTS

| | | |
|---|---|---|
| CN | 1447312 | 10/2003 |
| CN | 1476600 | 2/2004 |
| EP | 1318509 | 6/2003 |
| JP | 7-311942 | 11/1995 |
| JP | 2001-331940 | 11/2001 |
| JP | 2002-358648 | 12/2002 |
| JP | 2003-22532 | 1/2003 |
| JP | 2003-168211 | 6/2003 |

(Continued)

OTHER PUBLICATIONS

International Search Report issued Jun. 15, 2007 by WIPO in counterpart International Application No. PCT/KR2005/003003.

(Continued)

*Primary Examiner* — Jorge L Ortiz Criado
(74) *Attorney, Agent, or Firm* — Harness, Dickey & Pierce, P.L.C.

(57) ABSTRACT

A recording medium, and a method and apparatus for recording data in the recording medium. The recording medium including an inner area, a data area, and an outer area includes a first test area contained in the inner area, and a second test area contained in the outer area, wherein the first and second test areas are formed by a predetermined wobble modulation method equal to that of the data area. Therefore, the recording medium can be applied to a method for manufacturing a Blu-ray disc, and data can be effectively recorded/reproduced in/from the recording medium, such as the Blu-ray disc.

27 Claims, 17 Drawing Sheets

FOREIGN PATENT DOCUMENTS

| | | | |
|---|---|---|---|
| JP | 2003-168216 | | 6/2003 |
| JP | 2003-346379 | | 12/2003 |
| JP | 2004-014087 | | 1/2004 |
| KR | 2002-0019638 | | 3/2002 |
| KR | 2003-0033060 | | 4/2003 |
| KR | 2003-0085754 | | 11/2003 |
| KR | 10-2003-0094730 | | 12/2003 |
| KR | 10-2004-0039188 | | 5/2004 |
| RU | 2 298 842 | | 5/2007 |
| WO | WO02/23542 | | 3/2002 |
| WO | WO 02/47072 | A1 | 6/2002 |
| WO | WO 03/046898 | A1 | 6/2003 |
| WO | WO 03/100702 | A2 | 12/2003 |
| WO | WO 2004/066286 | A1 | 8/2004 |

OTHER PUBLICATIONS

Extended Search Report issued Nov. 26, 2008 by the European Patent Office in counterpart European Patent Application No. 05787110.5-1232.

Office Action issued Jun. 6, 2008 by the Chinese Patent Office in counterpart Chinese Patent Application No. 200580012650.7 (English language translation provided).

Decision on Grant issued May 27, 2009 by the Russian Patent Office in counterpart Russian Patent Application No. 2006136029/28 (English language translation).

Japanese Office Action dated Nov. 26, 2010 issued in corresponding Japanese Application No. 2007-531079.

Korean Office Action dated Jan. 13, 2011 issued in corresponding Korean Application No. 10-2005-0007014.

Chinese Patent Gazette dated Dec. 22, 2010 issued in corresponding Chinese Application No. 200580012650.7.

Korean Office Action dated Mar. 22, 2011 issued in corresponding Korean Application No. 10-2005-0023460.

Japanese Office Action dated Mar. 15, 2011 issued in corresponding Japanese Application No. 2007-531079.

Canadian Office Action dated Oct. 26, 2011 issued in corresponding Canadian Application No. 2,562,359.

* cited by examiner

PIC: Permanent Information & Control data
OPC: Optimum Power Control
TDMA: Temporary Disc Management Area
OTA: Outer Test Area (OTA)
HFM: High Frequency Modulated
MSK: Minimum shift keying
HMW: Harmonic Modulated Wave

FIG. 8

| ADIP unit number | ADIP unit type | ADIP nibble bit number | ADIP codeword nibble number |
|---|---|---|---|
| 0 | monotone | --- | --- |
| 1 | sync_0 | --- | |
| 2 | monotone | --- | |
| 3 | sync_1 | --- | |
| 4 | monotone | --- | |
| 5 | sync_2 | --- | |
| 6 | monotone | --- | |
| 7 | sync_3 | --- | |
| 8 | reference | --- | |
| 9 | data_x | $b_3$ | $c_0$ |
| 10 | data_x | $b_2$ | |
| 11 | data_x | $b_1$ | |
| 12 | data_x | $b_0$ | |
| 13 | reference | --- | --- |
| 14 | data_x | $b_3$ | $c_1$ |
| 15 | data_x | $b_2$ | |
| 16 | data_x | $b_1$ | |
| 17 | data_x | $b_0$ | |
| 18 | reference | --- | --- |
| : | : | : | : |
| 8+i*5 | reference | --- | --- |
| 9+i*5 | data_x | $b_3$ | $c_1$ |
| 10+i*5 | data_x | $b_2$ | |
| 11+i*5 | data_x | $b_1$ | |
| 12+i*5 | data_x | $b_0$ | |
| : | : | : | : |
| 78 | reference | --- | --- |
| 79 | data_x | $b_3$ | |
| 80 | data_x | $b_2$ | $c_{14}$ |
| 81 | data_x | $b_1$ | |
| 82 | data_x | $b_0$ | |

RECORDING MEDIUM, AND METHOD AND APPARATUS FOR RECORDING DATA IN THE RECORDING MEDIUM

This application claims the benefit of the Korean Patent Application No. 10-2005-0007014, filed on Jan. 26, 2005, and No. 10-2005-0023460, filed on Mar. 22, 2005, which are hereby incorporated by reference as if fully set forth herein.

This application claims the benefit of U.S. Provisional Application No. 60/608,901, filed on Sep. 13, 2004, in the name of inventor Sang Woon SUH, entitled "OPC AREA AND METHOD OF USING THE OPC AREA IN BD-R", which is hereby incorporated by reference as if fully set forth herein.

BACKGROUND OF THE INVENTION

1. Field of the Invention

The present invention relates to a recording medium, and more particularly to a physical structure efficiently used when recording data in the recording medium, and a method and apparatus for recording data in the recording medium using the physical structure.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

However, a preferred data record method for use in the BD has not yet been established, such that many limitations and problems occur in developing a BD-based optical recording/reproducing device. Specifically, the limitations and problems become serious in a specific technical field for calculating an optimum write power to recording data in the recording medium.

SUMMARY OF THE INVENTION

Accordingly, the present invention is directed to a recording medium, and a method and apparatus for recording data in the recording medium that substantially obviate one or more problems due to limitations and disadvantages of the related art.

An object of the present invention is to provide a physical structure suitable for a recording medium such as a BD, and a method and apparatus for recording data in the recording medium using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium including an inner area, a data area, and an outer area includes a first test area contained in the inner area, and a second test area contained in the outer area, wherein the first and second test areas are formed by a predetermined wobble modulation method equal to that of the data area.

In another aspect of the present invention, a method for recording data in a recording medium includes the steps of (a) reading position information indicating available area of a test area assigned to an outer area of the recording medium, the position information being included in management information recorded in the recording medium, and recognizing a physical position corresponding to the read position information, (b) performing an Optimum Power Control (OPC) process for calculating an optimum write power in the recognized available area, and (c) recording data in the recording medium using the calculated optimum write power.

In a further aspect of the present invention, an apparatus for recording data in a recording medium includes a pickup unit reading data recorded in the recording medium, the data including position information indicating available area of a test area assigned to an outer area of the recording medium, and the position information being included in management information recorded in the recording medium, and recording data in the recording medium, and a controller recognizing a physical position corresponding to the position information read from the pickup unit, searching an optimum write power by performing an Optimum Power Control (OPC) process in the recognized available area, and controlling the pickup unit to record data in the recording medium using the searched optimum write power.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5~8 are graphs illustrating a modulation method according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Optimum Power Control (OPC) area" is indicative of a predetermined area assigned to perform an OPC process in the recording medium. The term "Optimum Power control (OPC)" is indicative of a predetermined process capable of calculating an optimum write power when recording (test) data in a recordable optical disc.

In other words, if the optical disc is seated in a specific optical recording/reproducing device, the optical recording/reproducing device repeatedly performs a predetermined process for recording data in the OPC area of the optical disc, and reproducing the recorded data, such that it calculates an optimum write power applicable to the optical disc. Thereafter, the optical recording/reproducing device uses the calculated optimum write power when recording data in the optical disc. Therefore, the OPC area is required for the recordable optical disc.

The term "outer test area" is indicative of a specific area used by an optical recording/reproducing device (or a drive) in the recording medium, and can perform not only the OPC process but also a variety of tests required for the optical recording/reproducing device.

In this case, the OPC area and the outer test area are available for the OPC process. According to the present invention, the OPC area and the outer test area are generally referred to as test zones. It should be noted that the OPC performing in the OPC area be applicable to even the outer test area.

Figure 1:
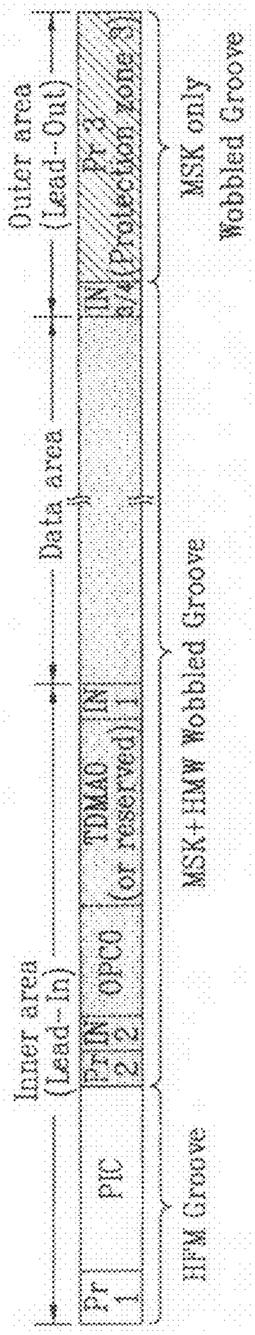
FIG. 1 is an optical disc structure capable of recording data therein according to the present invention.

FIG. 1 is an optical disc structure capable of recording data therein according to the present invention. For the convenience of description and better understanding of the present invention, a single-layered BD-R/RE capable of recording data therein is shown in FIG. 1.

Referring to FIG. 1, the optical disc sequentially includes an inner area, a data area, and an outer area on the basis of a disc inner area. A specific area contained in each of the inner area and the outer area is used as either a recording area for recording disc management information or a test area. The data area records actual user data therein.

A detailed description of the inner area and the outer area will hereinafter be described. The inner area includes a PIC (Permanent Information & Control data) area, an OPC area, and two information areas (i.e., info-areas) IN1 and IN2. The PIC area records disc management information as an embossed HFM (High Frequency Modulated) signal. The OPC area serving as a test area is adapted to perform the OPC process. The info-areas IN1 and IN2 record various disc management information including a Defect Management Area (DMA).

In association with the above-mentioned description, a write-once BD-R further includes a Temporary Disc Management Area (TDMA) adjacent to the OPC area, but a BD-RE includes a reserved area in the vicinity of the OPC area. The reserved area acts as a spare area to be used later. The outer area includes two other info-areas IN3 and IN4.

Protection zones Pr1 and Pr2 for disc protection are included in the inner area, and a protection zone Pr3 for disc protection is included in the outer area. Specifically, a protection area located at the innermost disc area of the inner area is referred to as a first protection zone "Pr1". A protection area located at the outermost disc area of the outer area is referred to as a third protection zone "Pr3". A protection area located between the PIC area and the info-area 1N2 in the inner area is referred to as a second protection zone "Pr2". Particularly, the second protection area "Pr2" is indicative of a changeover area between an embossed PIC area and a recordable area, and is referred to as a "buffer zone for changeover".

The BD-R/RE according to the present invention records data in a groove part in a recording layer composed of a land part and the groove part. The groove part is composed of an HFM-groove and a wobbled groove.

According to a variety of modulation schemes, the wobbled groove is classified into an MSK+HMW modulation groove, and an MSK (Minimum Shift Keying) modulation groove. The MSK is indicative of an acronym of a Minimum Shift Keying, and the HMW is indicative of an acronym of a Harmonic Modulated Wave.

Particularly, the wobbled groove is configured in the form of a wobbled shape using a modulation method associated with a sinusoidal wave in a groove contained in a recording layer. The optical recording/reproducing device can read address information (i.e., ADIP: Address In Pre-groove) of a corresponding groove and general disc information using the above-mentioned wobbled shaped. A detailed description thereof will hereinafter be described with reference to FIGS. 5~8.

The above-mentioned modulation method is differently applied to individual areas contained in the disc according to unique characteristics of the areas. The Pr1 area and the PIC area contained in the inner area are configured in the form of the HFM-groove. The Pr3 area contained in the outer area is configured in the form of the wobbled groove to which only the MSK modulation is applied. Excepting the above-mentioned areas, the inner area, the outer area, and the data area are configured in the form of a wobbled groove to which the MSK+HMW modulation is applied.

Figure 2:
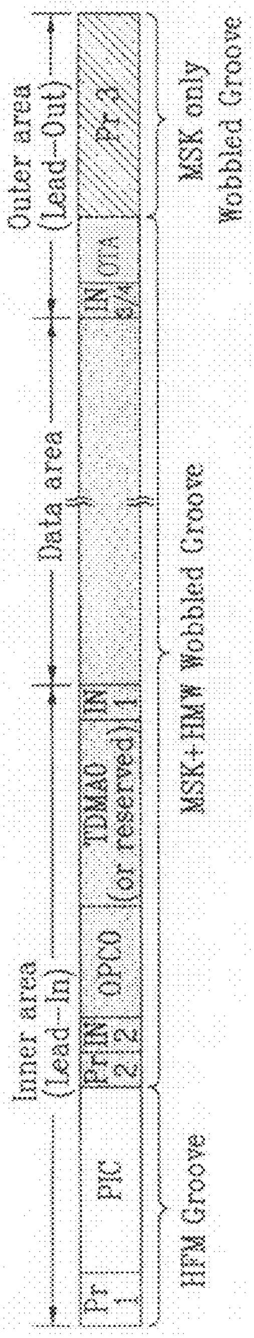
FIG. 2 is a single-layered optical disc structure capable of recording data therein according to the present invention.

FIG. 2 is a single-layered optical disc structure capable of recording data therein according to the present invention. Compared with FIG. 1, the single-layered optical disc structure shown in FIG. 2 further includes an outer test area (also referenced as OTA) in the outer area. The following description will be mainly disclosed on the basis of the outer test area, and the remaining parts other than the outer test area are equal to those of FIG. 1, such that its detailed description will herein be omitted for the convenience of description.

As stated above, the outer test area is indicative of a test zone where the optical recording/reproducing device can perform a disc test for various purposes. Typically, the OPC process can be performed in the outer test area in the same manner as in the OPC area acting as another test zone. It is obvious to those skilled in the art that not only the OPC process but also another test can be performed in the outer test area, and it should be noted that the present invention is not limited to the above-mentioned example and is applicable to other examples as necessary.

Compared with FIG. 1, the outer test area shown in FIG. 2 is physically included in the outer area. Therefore, the Pr3 area of FIG. 2 is less than the Pr3 area of FIG. 1 by a predetermined size corresponding to an additionally-assigned outer test area. It is preferable that the outer test area be less than the OPC area (i.e., 2048 clusters) contained in the inner area. For example, the outer test area is assigned 512 clusters.

The above-mentioned additionally-assigned outer test area uses the MSK+HMW modulation method, in which the MSK modulation and the HMW modulation are mixed, in the same manner as in the OPC area of the inner area and the data area. In other words, a newly-assigned outer test area is adapted to record/reproduce test data. In order to correctly record the test data, reliable address information (i.e., ADIP) must be guaranteed in the same manner as in the general data area.

Figure 3A:
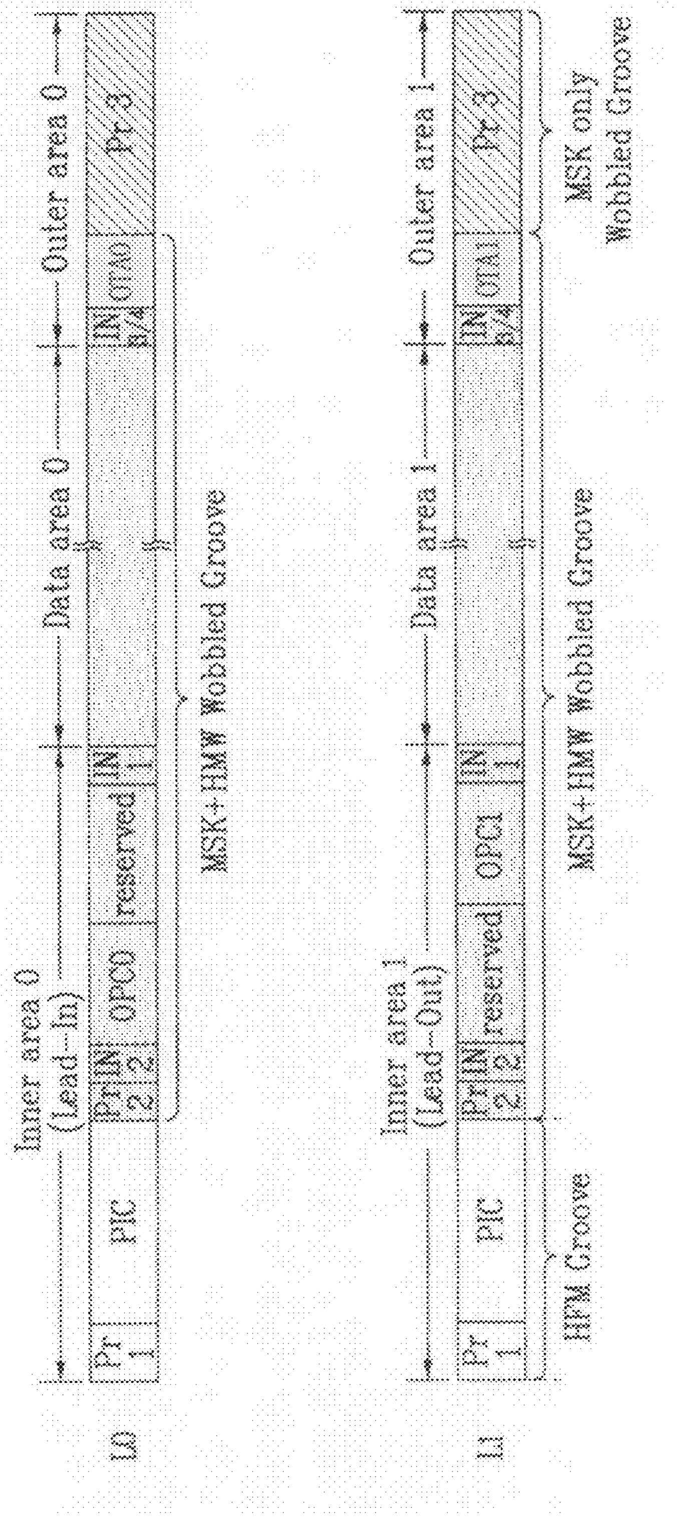
FIGS. 3*a*~3*b* are dual-layered optical disc structures capable of recording data therein according to a preferred embodiment of the present invention.
Figure 3B:
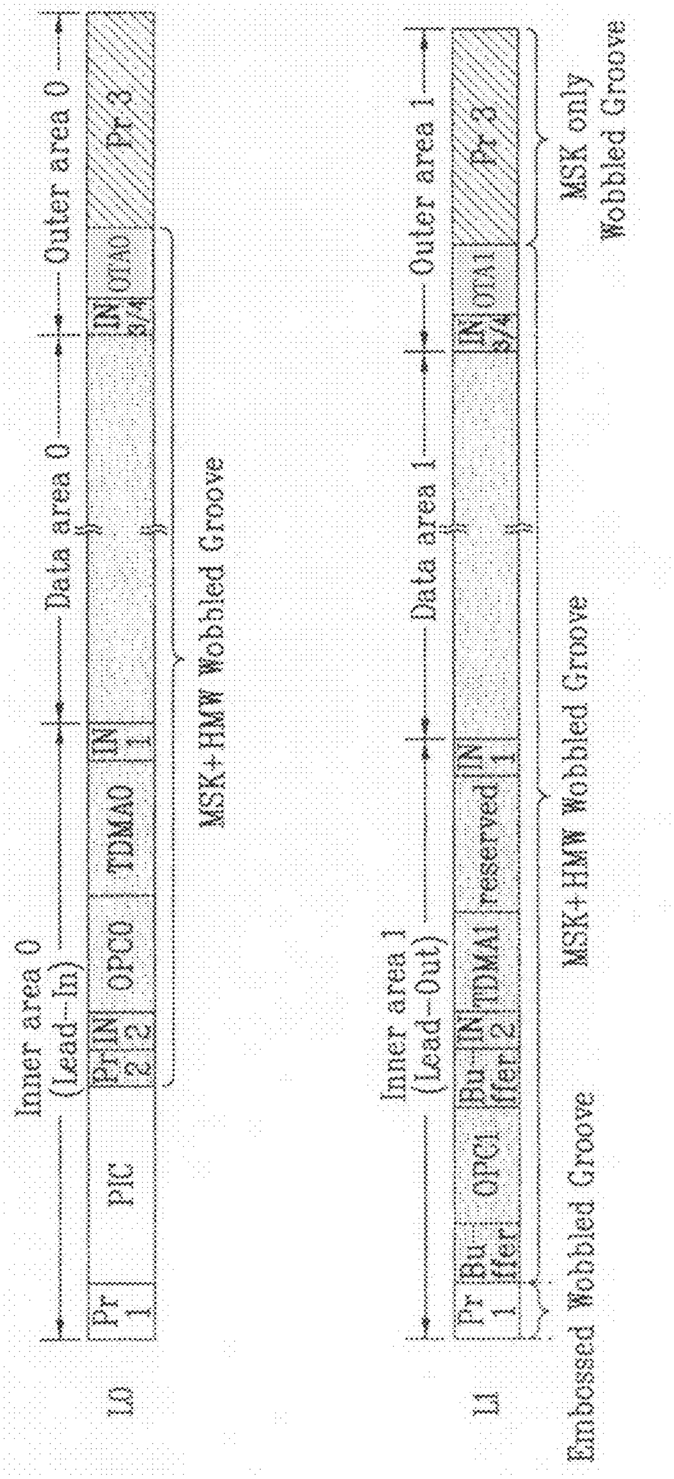

FIGS. 3*a*~3*b* are dual-layered optical disc structures capable of recording data therein according to a preferred embodiment of the present invention. A dual-layered BD-RE is shown in FIG. 3*a*. A dual-layered BD-R capable of recording data therein is shown in FIG. 3*b*. In association with the above-mentioned description, one of two recording layers is referred to as a "Layer0 (L0)", and the other one is referred to as a "Layer1 (L1)".

As shown in FIG. 3*a*, individual recording layers have the same structure in the dual-layered BD-RE according to the present invention. The outer area of the recording layer L0 includes the outer test area OTA0, and the outer area of the recording layer L1 includes the outer test area OTA1. The MSK+HMW modulation method in which the MSK modulation and the HMW modulation are mixed is applied to the outer test areas OTA0 and OTA1 in the same manner as in the data area.

As can be seen from FIG. 3*b*, the write-once dual-layered BD-R according to the present invention includes outer test areas in outer areas of individual recording layers L0 and L1. The outer test areas OTA0 and OTA1 uses the MSK_HMW modulation method in which the MSK modulation and the HMW modulation are mixed in the same manner as in the data area.

Compared with the BD-RE shown in FIG. 3*a*. the write-once BD-R shown in FIG. 3*b* requires many more management information recording areas due to write-once characteristics, such that a Temporary Disc Management Area (TDMA) is added to the inner area, and the inner area of the second recording layer L1 includes the OPC area (OPC1) instead of the PIC area embossed by the HFM.

In association with the above-mentioned description, the outer test area of the present invention is more efficiently available for the write-once BD-R shown in FIG. 3*b*. In more detail, the write-once BD-R requires many more management information recording layers due to the write-once characteristics as previously stated, such that it uses a outer test area as a new test area capable of substituting for the OPC area of the inner area, and obviates the problem that data is no longer recorded in the write-once BD-R due to a shortage of the OPC area.

Figure 4A:
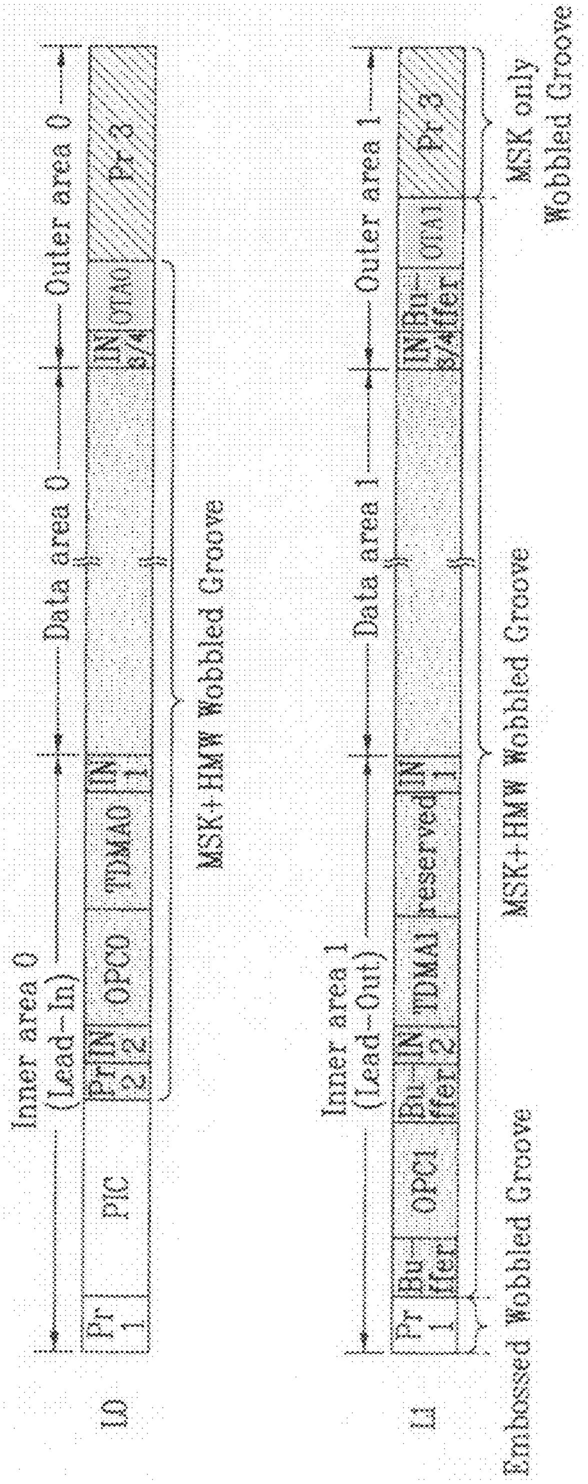
FIGS. 4*a*~4*b* are dual-layered optical disc structures capable of recording data therein according to another preferred embodiment of the present invention.
Figure 4B:
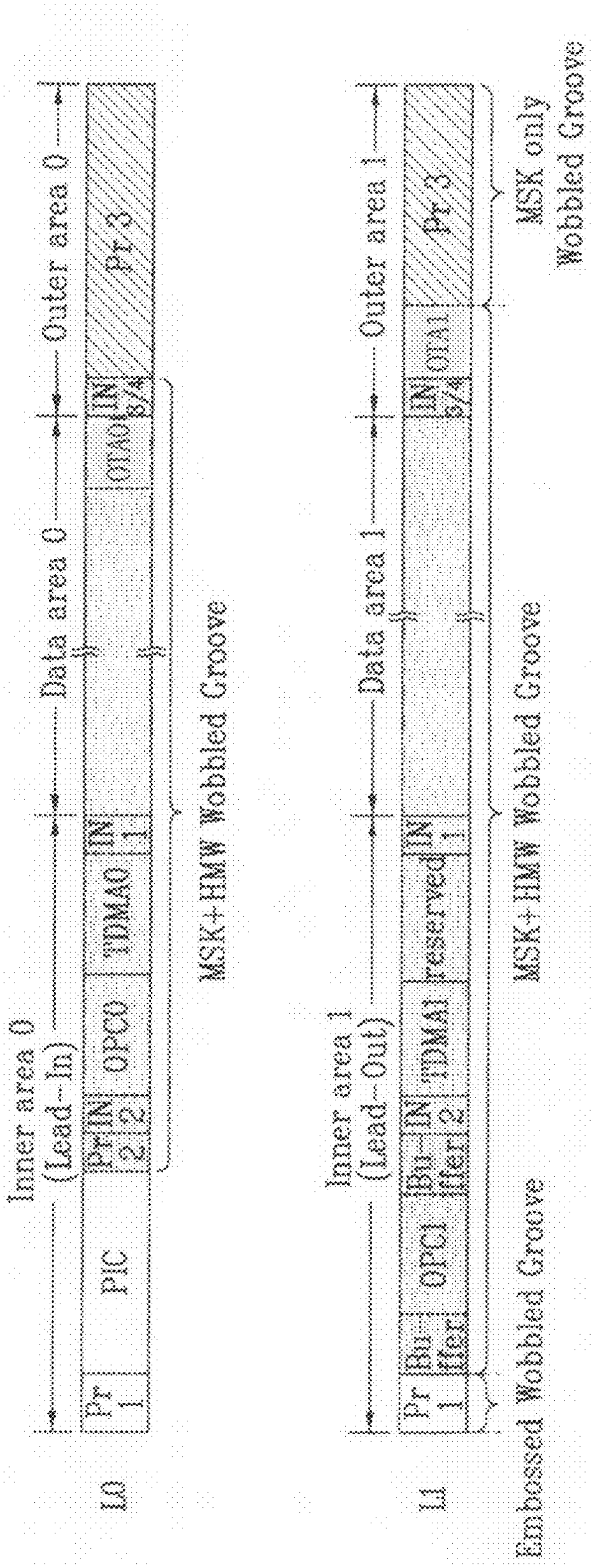

FIGS. 4*a*~4*b* are dual-layered optical disc structures capable of recording data therein according to another preferred embodiment of the present invention. A method for assigning the outer test area in individual recording layers is shown in FIGS. 4*a*~4*b*.

In association with the above-mentioned description, although FIGS. 4*a*~4*b* exemplarily show the write-once recordable disc (e.g., a BD-R) for the convenience of description, technical ideas of the present invention can be applied to the rewritable disc (e.g., BD-RE) as described above.

As shown in FIG. 4*a*, when assigning the outer test areas OTA0 and OTA1 to individual outer areas of individual recording layers, the outer test areas OTA0 and OTA1 are not physically located at the same position on the basis of a progression direction of an optical beam.

In other words, provided that the outer test areas are used for the OPC process in the same manner as in the OPC area of the inner area, a predetermined power value is gradually used for the OPC process in the direction from high power to low power or in the direction from low power to high power, or a power value contained in a predetermined range on the basis of a reference power is used for the OPC process.

Provided that outer test areas OTA0 and OTA1 are physically located at the same position on the basis of a progression direction of an optical beam between recording layers adjacent to each other, the probability of generating light-beam interference even in the outer test area (e.g., OTA1) contained in a neighboring recording layer other than an actually-used outer test area (e.g., OTA0) is increased, resulting in the occurrence of a negative influence upon a process for calculating an optical writing power using the OPC process. In this way, the OPC areas OPC0 and OPC1 contained in the inner areas are not physically located at the same position on the basis of a progression direction of an optical beam.

Therefore, the outer area of the second recording layer further includes a buffer area located at the same position as that of the outer test area (OTA0) of the first recording layer on the basis of a progression direction of an optical beam, and the outer test area (OTA1) is then allocated in an outer direction. Needless to say, individual outer-area allocation methods of the first recording layer L0 and the second recording layer L1 can be performed in either order. For example, the buffer area may be added to the outer area of the first recording layer L0 at the same position as that of the outer test area (OTA1) of the second recording layer L1 on the basis of a progression direction of the light or optical beam, and the outer test area (OTA0) may also be allocated in the outer direction.

In association with the above-mentioned description, the outer test areas (OTA0 and OTA1) use the MzK+HMW modulation method in which the MSK modulation and the HMW modulation are mixed in the same manner as in the data area.

As can be seen from FIG. 4*b*, the outer test area is characterized in that it is allocated to not only outer areas of individual recording layers but also a neighboring data area. In other words, the recording layer is classified into a first-type recording layer (e.g., L1) and a second-type recording layer (e.g., L0). The outer test area (OTA1) is contained in the outer area of the first-type recording layer, the outer test area (OTA0) is contained in the data area adjacent to the outer area in the second-type recording layer, and the first-type recording layer and the second-type recording layer are alternately included in the optical disc.

FIGS. 5~8 are graphs illustrating a modulation method according to the present invention.

Figure 5:
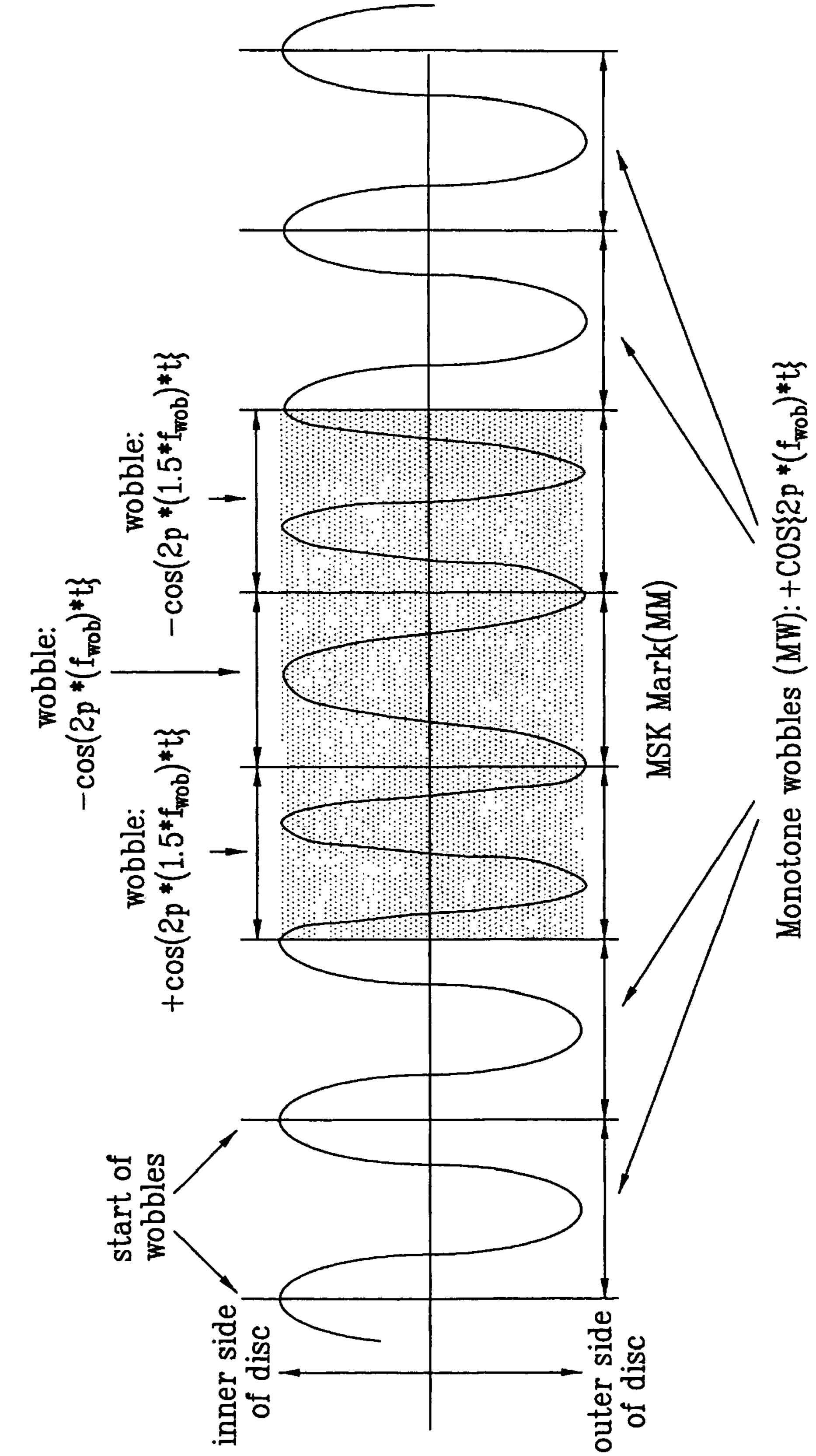

FIG. 5 shows the MSK modulation method. Particularly, the Pr3 area (i.e., protection zone 3) contained in the outer area is formed by only the MSK modulation.

The MSK modulation method is implemented by performing a cosine transform at a wobble frequency $f_{wob}$ as shown in FIG. 5. A general wobble is referred to as a "monotone wobble (MW)", and three wobbles generated by changing the wobble frequency $f_{wob}$ and a cosine code are each referred to as an "MSK Mark wobbled (MM)".

Figure 6:
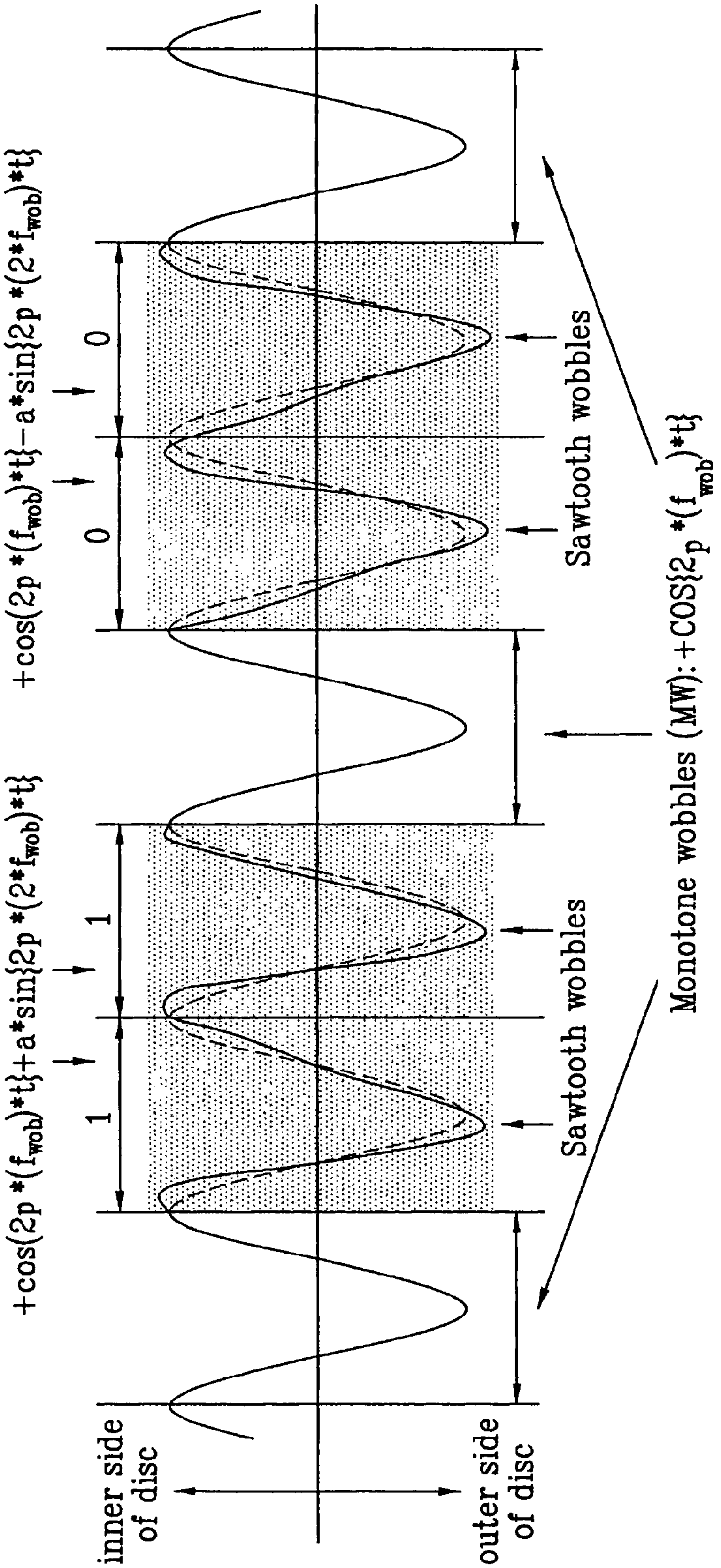

FIG. 6 shows the HMW modulation method. Particularly, the OPC area contained in the inner area, and the outer test area and the data area contained in the outer area are formed by the MSK+HMW modulation method in which the HMW modulation and the MSK modulation are mixed.

In association with the above-mentioned description, as shown in FIG. 6, the HMW modulation method is implemented by the cosine transform performed at a first wobble frequency $f_{wob}$ and a sine transform performed at a second wobble frequency $2*f_{wob}$. If the sine transform has a positive (+) code, the value of 1 is determined. If the sine transform has a negative (−) code, the value of 0 is determined. The wobble formed by the above-mentioned method is referred to as a "sawtooth wobble (STW)". The sawtooth wobble (STW) of the value of 1 is referred to as an STW ("1"). The sawtooth wobble (STW) of the value of 0 is referred to as an STW ("0").

Figure 7:
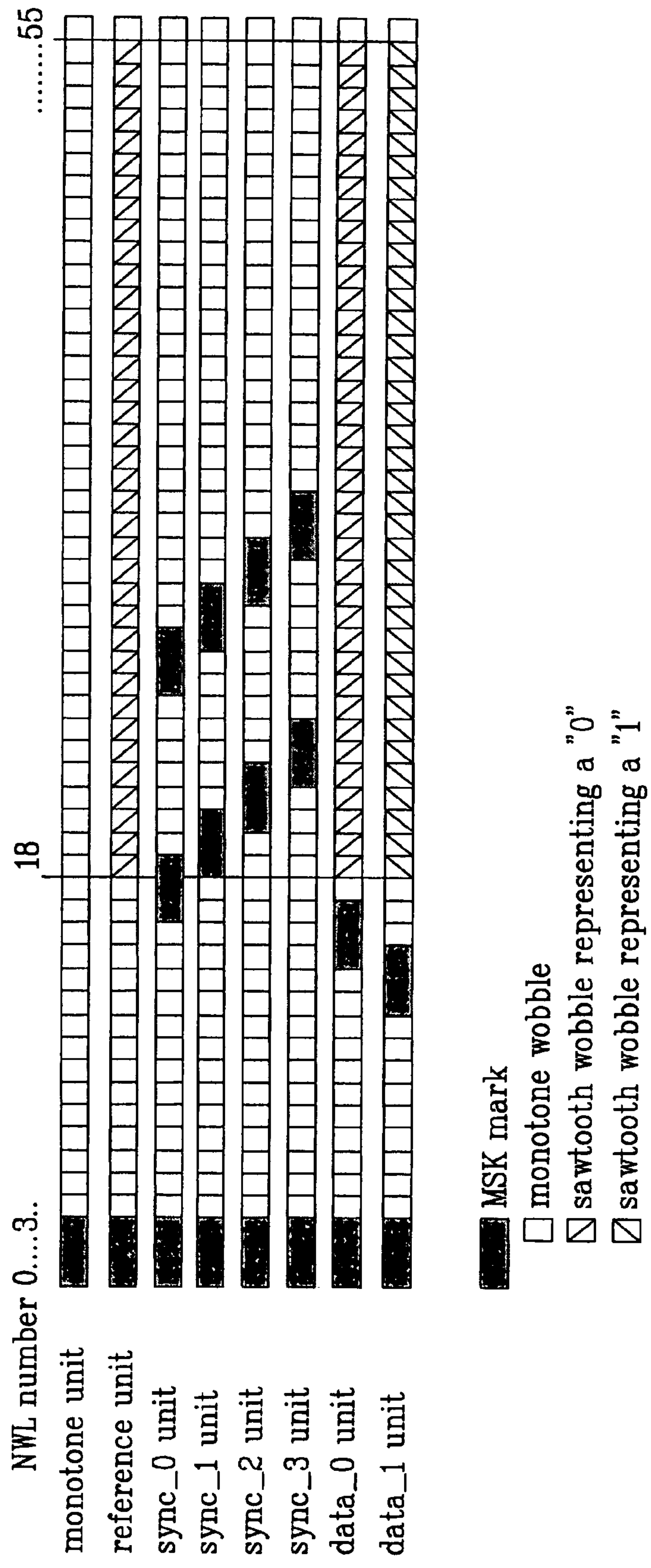

FIG. 7 shows a method for identifying an ADIP unit using the MSK+HMW modulation method. As can be seen from FIG. 7, a single ADIP unit includes 56 wobbles. Three head wobbles of all ADIP units are each composed of an MSK mark (MM). The ADIP units are classified into the following units according to wobble types.

In other words, the ADIP unit composed of "1 mM+53 MW" is referred to as a monotone unit, and the ADIP unit composed of "1 mM+15 MW+37 STW ("0")+1 MW" is referred to as a reference unit.

The ADIP unit composed of "1 mM+13 MW+1 mM+7 MW+1 mM+27 MW" is referred to as "sync_0 unit". The ADIP unit composed of "1 mM+15 MW+1 mM+7 MW+1 mM+25 MW" is referred to as "sync_1 unit". The ADIP unit composed of "1 mM+17 MW+1 mM+7 MW+1 mM+23 MW" is referred to as "sync_2 unit". The ADIP unit composed of "1 mM+19 MW+1 mM+7 MW+1 mM+21 MW" is referred to as "sync_3 unit".

The ADIP unit composed of "1 mM+9 MW+1 mM+3 MW+37 STW ("0") is referred to as "data_1 unit". The ADIP unit composed of "1 mM+11 MW+1 mM+1 MW+37 STW ("1")+1 MW" is referred to as "data_0 unit". In other words, if "data_1 unit" is determined, the value of 1 is established. If "data_0 unit" is determined, the value of 0 is established.

FIG. 8 shows a method for constructing a single ADIP word composed of 83 ADIP units shown in FIG. 7.

As can be seen from FIG. 8, the 9 head ADIP units of the ADIP word sequentially include "monotone unit", "sync_0 unit", "monotone unit", "sync_1 unit", "monotone unit", "sync_2 unit", "monotone unit", "sync_3 unit", and "reference unit".

ADIP units from 10-th ADIP unit (i.e., ADIP unit number=9) to 83-rd ADIP unit (i.e., ADIP unit number=82) are each composed of either "data_0 unit" or "data_1 unit" shown in FIG. 7. Five units are formed by combining the ADIP units by four bits, such that the above-mentioned units are referred to as "ADIP codeword nibble numbers (c0~c14)".

A physical address (i.e., Physical ADIP Address "PAA") of a corresponding wobble and auxiliary data are recorded in the above-mentioned ADIP codeword nibble number (c0~c14). The optical recording/reproducing device reads the single ADIP word, such that it can recognize the PAA position of a current disc.

Technical ideas shown in FIGS. 5~8 are applied to all areas to which the MSK+HMW modulation method is applied. Therefore, the MSK+HMW modulation method is applied to even the outer test area contained in the outer area.

The reason why the MSK+HMW modulation method is applied to the outer test area is as follows. The outer test area is indicative of a specific area for recording actual test data. Therefore, if only the MSK modulation method is applied to the outer test area in the same manner as in the Pr3 area (i.e., protection zone 3), the sawtooth wobble (STW) caused by the HMW modulation is not used, such that "monotone unit" and "reference unit" from among ADIP units shown in FIG. 7 cannot be distinguished from each other, and an unexpected error may occur in distinguishing "data_1 unit" and "data_0 unit".

Preferably, the outer test area may use the MSK+HMW modulation method to prevent the occurrence of the unexpected error, differently from the Pr3 area (i.e., protection zone 3) to which only the MSK modulation method is applied.

The present invention can be applied to a recording medium provided when there are a plurality of layers acting as recording layers.

Figure 9:
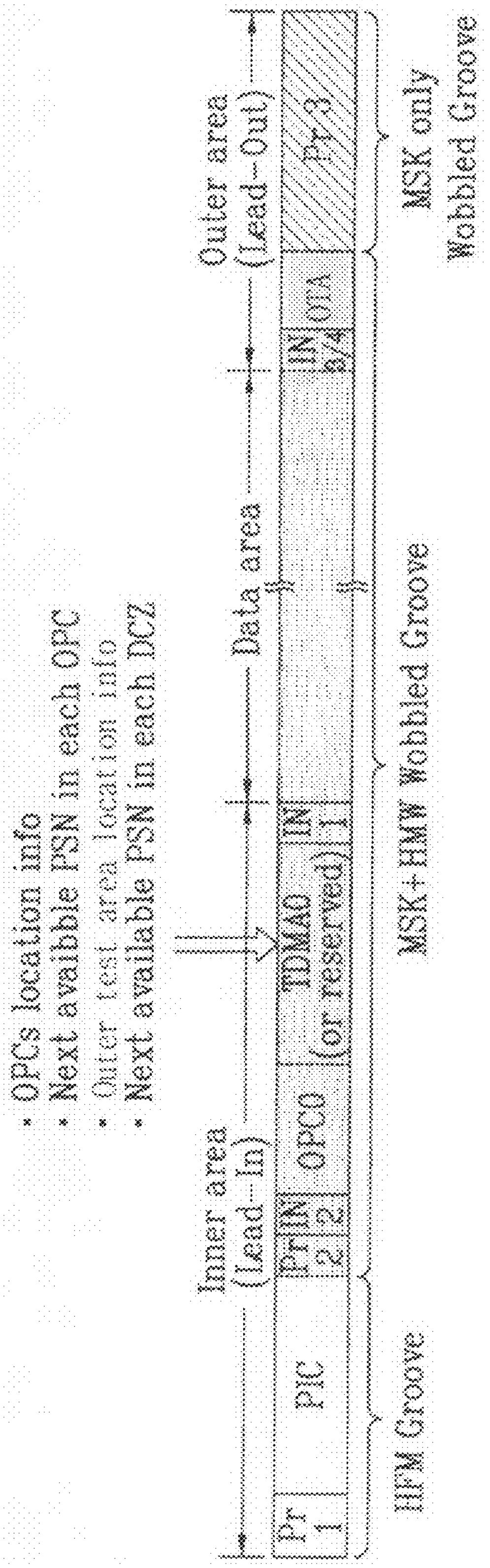
FIG. 9 is a conceptual diagram illustrating a method for recording management information in a recordable optical disc according to the present invention.

FIG. 9 is a conceptual diagram illustrating a method for recording management information capable of managing the OPC area and the outer test area in an optical disc.

In more detail, a DMA (Disc Management Area) and/or a TDMA (Temporary DMA) are included in the inner area and/or outer area of the optical disc. Management information of the OPC area and the outer test area is recorded in the TDMA or DMA.

In other words, the management information is recorded in the TDMA in the case of a write-once recordable disc such as BD-R, and the management information is recorded in the DMA in the case of a rewritable disc such as a BD-RE. As shown in FIG. 1, the DMA is generally included in info-areas IN1 and IN2 of the inner area or other info-areas IN3 and IN4 of the outer area.

In association with the above-mentioned description, the management information of the OPC area and the outer test area may include information indicative of positions of the OPC area and the outer test area for every recording layer of the disc, for example, start address information and/or end address information (i.e., "OPCs location info" and "outer test area location info"), and information indicative of current available positions in individual OPC and outer test areas (i.e., "Next available PSN in each OPC" and "Next available PSN in each outer test area").

Therefore, if the disc is seated in the optical recording/reproducing device, the optical recording/reproducing device reads management information of the OPC area and the outer test area contained in the TDMA or DMA. Therefore, the optical recording/reproducing device recognizes position information of the OPC area contained in the disc and other position information of the available OPC area, and recognizes position information of the outer test area and other position information of the available outer test area, such that it can perform the OPC process at the recognized positions.

It is obvious to those skilled in the art that management information associated with the OPC area and the outer test area are equally applied to all optical discs shown in FIGS. 2~4*b*.

Figure 10:
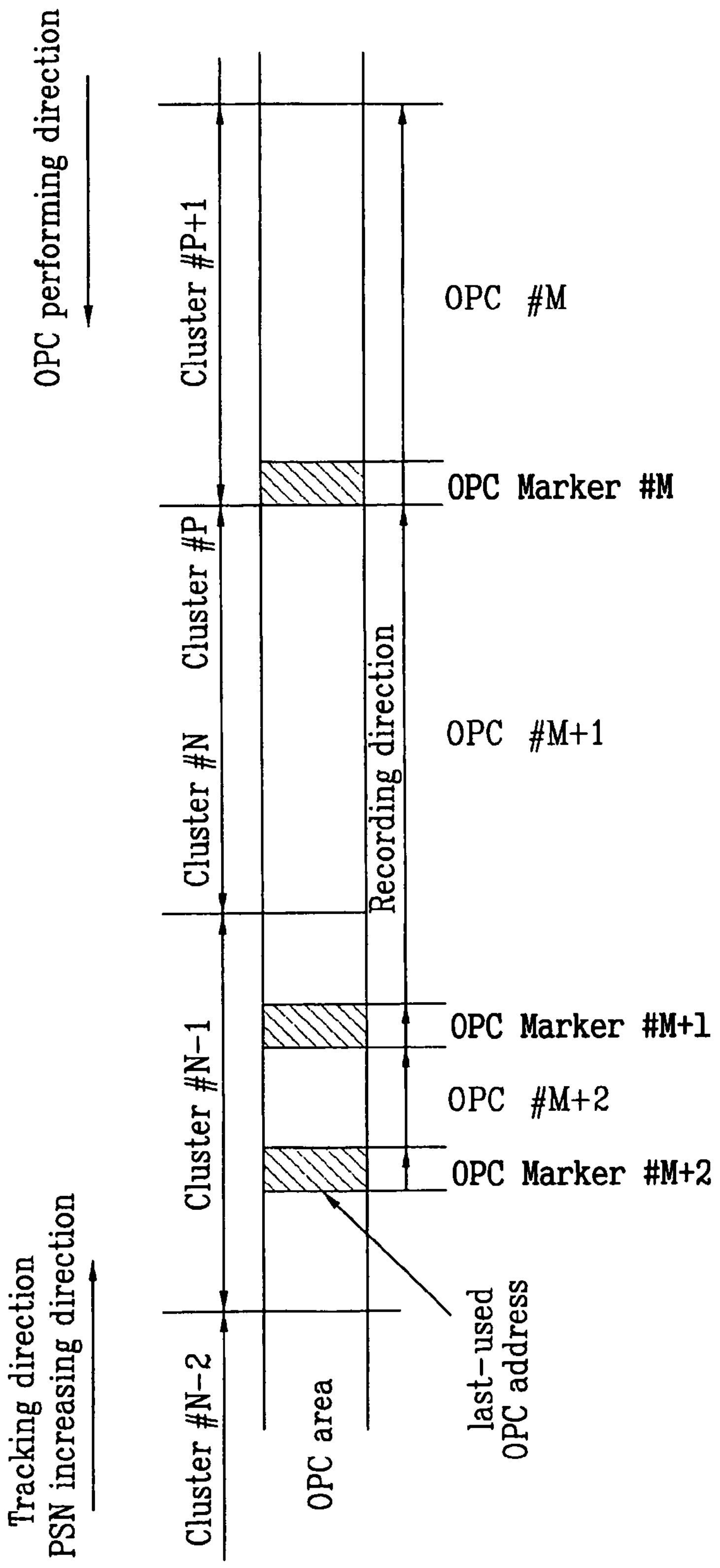
FIG. 10 is a conceptual diagram illustrating a method for performing an OPC process according to the present invention.

FIG. 10 is a conceptual diagram illustrating a method for performing an OPC process according to the present invention.

A recording-medium tracking direction of the optical recording/reproducing device in the recording medium is determined to be a PSN increasing direction along which the PSN is increased in the direction from a low PSN (Physical Section Number) to a high PSN. A direction for performing the OPC process in the recording medium is determined to be a PSN reducing direction along which the PSN is decreased in the direction from a high PSN to a low PSN.

A recording direction after the OPC process is determined to be a PSN increasing direction from a low PSN to a high PSN in the same manner as in the tracking direction.

In association with the above-mentioned description, a unit for recording data by performing the OPC process in the OPC area may exactly correspond to a 1-cluster unit whereas a unit for recording data in a data area of the recording medium is a 1-cluster unit. However, a data recording area acquired by the OPC process may be less than the 1 cluster, may also be larger than the 1 cluster.

In other words, a unit of data recorded to perform the OPC process is equal to an Address Unit Number (AUN). The AUN is indicative of address information used during a data recording time. It is obvious to those skilled in the art that an unused OPC area acting as a previous area formed prior to the data recording does not include the above-mentioned AUN information.

In this case, the AUN acts as a unit having a range less than that of the cluster, and a single cluster includes 16 AUNs. In more detail, a single OPC process performing length is selected by the optical recording/reproducing device, and is not limited by the number of physical clusters.

FIG. 10 shows a specific case in which three OPC processes are performed. In more detail, FIG. 10 shows a plurality of parts, each of which performs the OPC process, and a plurality of OPC markers for identifying individual parts.

A part for performing a first OPC process is denoted by "Cluster #P+1", and includes a first part denoted by "OPC #M" and a second part denoted by "OPC Marker #M". The "OPC #M" part records data therein, and the "OPC Marker #M" part identifies the "OPC #M" part.

A part for performing a second OPC process includes "Cluster #P", "Cluster #N", and some parts of "Cluster #N-1". A part denoted by "OPC #M+1" records data therein, and the "OPC Marker #M+1" identifies the "OPC #M+1" part.

A part for performing a third OPC process is composed of some parts of the "Cluster #N-1" part. In more detail, the part for performing the third OPC process includes "OPC #M+2" and "OPC Marker #M+2". The "OPC #M+2" part records data therein, and the "OPC Marker #M+2" part identifies the "OPC #M+2" part. In this case, "Cluster #N-2" and some parts of the "Cluster #N-1" part positioned prior to the "OPC Marker #M+2" part serve as unused cluster areas.

In association with the above-mentioned description, the distance between two successive OPC markers from among OPC markers capable of identifying data recording areas associated with the OPC process is equal to or less than a predetermined distance corresponding to 16 clusters. For example, in order to satisfy the above-mentioned requirements in the OPC process requiring at least 16 clusters, the OPC marker must be inserted into the OPC process. In this case, the above-mentioned OPC marker must have a predetermined length corresponding to at least 868 NWLs (Nominal Wobble Lengths).

The "OPC #M" part shown in FIG. 10 occupies a single cluster (i.e., 1 cluster) in the OPC area. The "OPC #M+1" part occupies a predetermined area larger than the 1 cluster in the OPC area. The "OPC #M+2" part occupies a predetermined area less than the 1 cluster in the OPC area. It can be understood that the OPC process is performed in unit smaller than cluster unit, for example in AUN unit.

Figure 11:
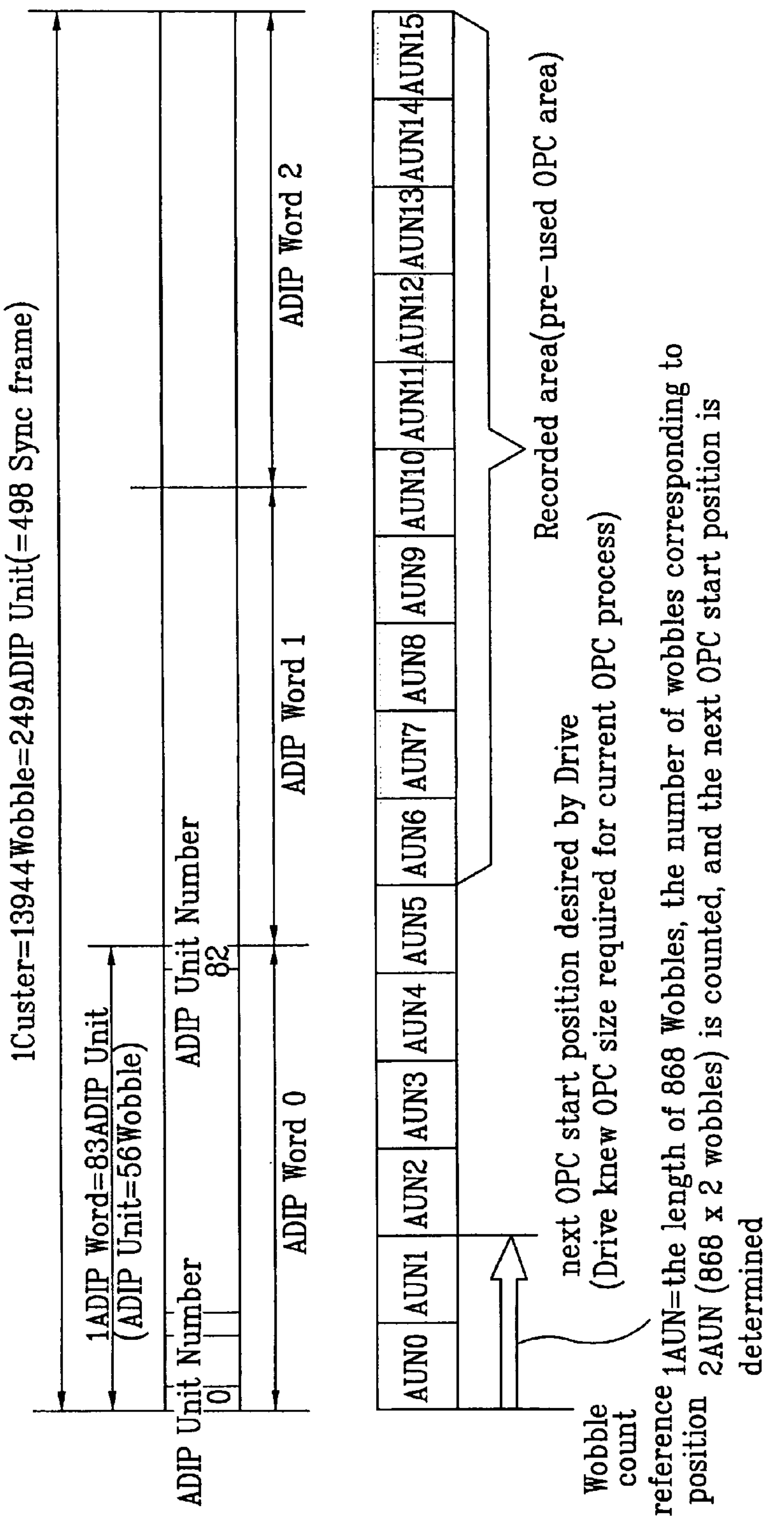
FIG. 11 is a conceptual diagram illustrating a method for searching for an OPC start position according to the present invention.

FIG. 11 is a conceptual diagram illustrating a method for searching for an OPC start position according to the present invention.

The 1 cluster from among the OPC area is shown in FIG. 11. The 1 cluster corresponds to 13944 wobbles, 249 ADIP units, 498 sync frames and 3 ADIP words. In association with the above-mentioned description, the 1 ADIP word includes 83 ADIP units, and the ADIP unit includes 56 wobbles. The 1 cluster includes 16 AUNs. In this case, the wobble is indicative of a NWL (Nominal Wobble Length).

For example, a pre-used (i.e., last used) OPC area (i.e., AUN6~AUN15) contained in the 1 cluster is indicative of 10 AUNs (Address Unit Numbers), and an unused OPC area is indicative of 6 AUNs from AUN0 to AUN5. The AUN 6 in the last used OPC area can be detected by inserting the OPC marker in front of the AUN 6 as described in FIG. 10. The OPC performing size indicative of a predetermined size required for a current OPC process is predetermined by the optical recording/reproducing device, and can be established in various ways. It is assumed that the OPC performing size is equal to 4 AUNs from AUN2 to AUN5.

Therefore, if a user desires to perform a new OPC process from a predetermined position of the AUN2, the user must search for a physical position corresponding to the AUN2.

Therefore, in order to determine the OPC start position using a wobble count process, there is a need for a wobble-count reference position to be found. If a predetermined reference wobble is detected in a detecting process of the optical recording/reproducing device, the detected reference wobble is considered to be a wobble-count reference position. Preferably, the wobble-count reference position may be equal to a start position of the cluster.

The above-mentioned cluster start position indicative of the wobble-count reference position is identical with a start position of the ADIP word. Referring to FIGS. 7~8, the 9 head ADIP units of the ADIP word sequentially correspond to "monotone unit", "sync_0 unit", "monotone unit", "sync_1 unit", "monotone unit", "sync_2 unit", "monotone unit", "sync_3 unit", and "reference unit". Therefore, if the 9 head ADIP units of the ADIP word are sequentially detected or the first "monotone unit" is detected during a search time of the optical recording/reproducing device, the ADIP-word start position is established. In other words, the cluster start position is considered to be a wobble-count reference position.

According to another example of the above-mentioned reference position, it is preferable that the ADIP-word start position contained in the 1 cluster be considered to be the wobble-count reference position.

In other words, the 1 cluster includes three ADIP words. In this case, if the next OPC start position is in the "ADIP Word 1" area or the "ADIP Word 2" area, the 9 head ADIP units of the ADIP word indicative of a start position of the "ADIP Word 2" area sequentially correspond to "monotone unit", "sync_0 unit", "monotone unit", "sync_1 unit", "monotone unit", "sync_1 unit", "monotone unit", "sync_2 unit", "monotone unit", "sync_3 unit", and "reference unit". Otherwise, if the first "monotone unit" is detected, the a start position of "ADIP Word 1" area or a start position of the "ADIP Word 2" area is determined to be a wobble-count reference position, such that the number of wobbles can be counted.

Therefore, if the wobble-count reference position is determined, and size information a pre-used OPC area acting as a recorded area and size information of an OPC area required for a current OPC process are recognized, the optical recording/reproducing device counts the number of wobbles at the wobble-count reference position, and searches for an OPC start position desired by a drive.

According to the preferred embodiment shown in FIG. 11, a drive counters wobbles of two AUNs from AUN0 to AUN1. A single AUN corresponds to the length of 868 wobbles. Therefore, two AUNs correspond to the length of 868*2 wobbles, the drive counts the number of 868*2 wobbles to determine an OPC start position, and performs the OPC process in order to calculate an optimum write power at the determined OPC start position.

Figure 12:
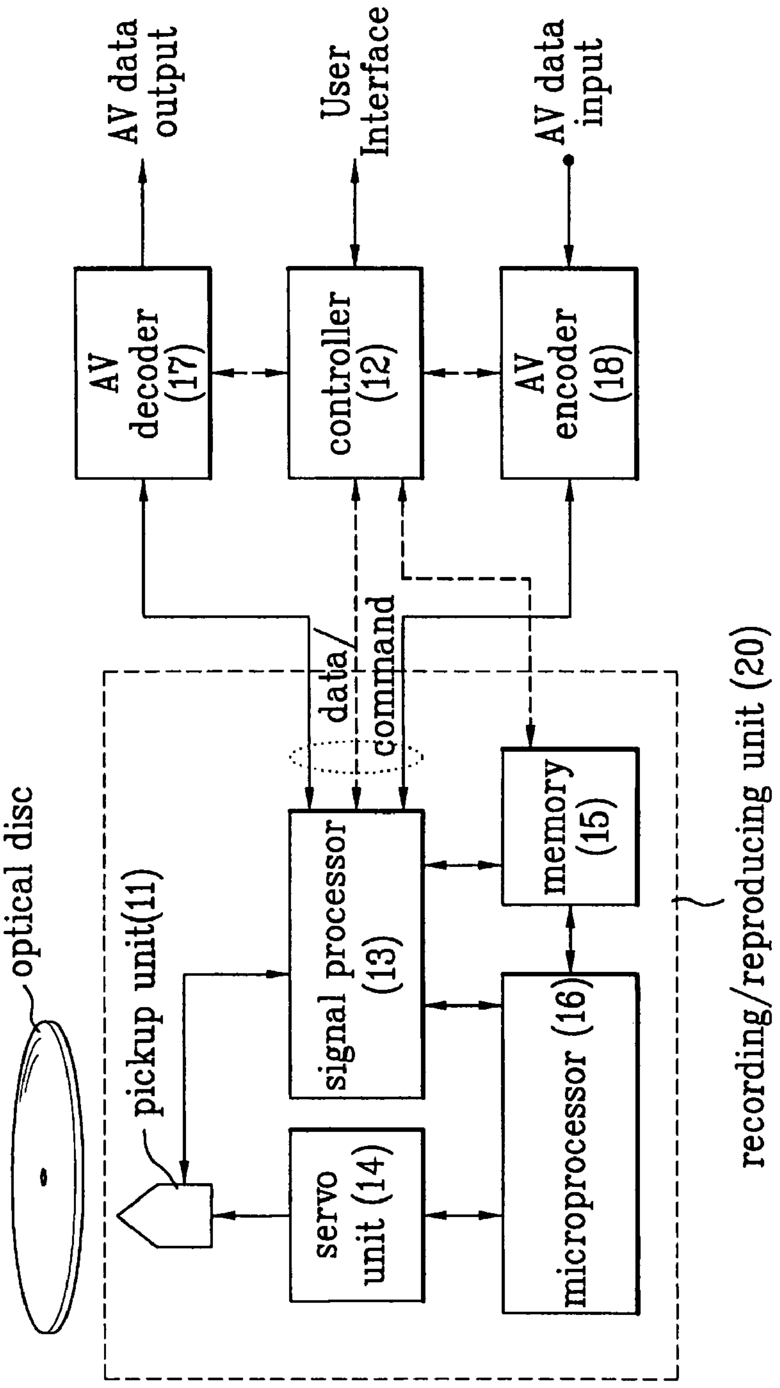
FIG. 12 is a block diagram illustrating an optical recording/reproducing device according to the present invention.

FIG. 12 is a block diagram illustrating an optical recording/reproducing device according to the present invention.

Referring to FIG. 12, the optical recording/reproducing device includes a recording/reproducing unit 20 for recording/reproducing data in/from an optical disc, and a controller 12 for controlling the recording/reproducing unit 20.

The recording/reproducing unit 20 includes a pickup unit 11, a signal processor 13, a servo unit 14, a memory 15, and a microprocessor 16. The pickup unit 11 directly records data in the optical disc, or reads data recorded in the optical disc. The signal processor 13 receives a signal read from the pickup unit 11, restores the received signal to a desired signal value, or modulates a signal to be recorded into another signal recorded in the optical disc, such that it transmits the recovered or modulated result. The servo unit 14 controls operations of the pickup unit 11, such that it correctly reads a desired signal from the optical disc, and correctly records the signal in the optical disc. The memory 15 temporarily stores not only management information including PIC data but also data. The microprocessor 16 controls overall operations of the above-mentioned components.

The above-mentioned recording/reproducing unit 20 performs a predetermined test in a test area of a recording medium, such that it calculates an optimum write power. The recording/reproducing unit 20 records the calculated optimum write power, and records data in the recording medium at the calculated optimum write power upon receiving a recording command from the controller 12.

The recording/reproducing unit 20 determines whether the optical disc acting as the recording medium is formatted in an initialization process. If the optical disc is not formatted, the recording/reproducing unit 20 performs the formatting of the optical disc.

In association with the above-mentioned description, the optical recording/reproducing device composed of only the recording/reproducing unit 10 is referred to as a drive, and is generally used as a peripheral device of a computer.

The controller 12 controls operations of overall constituent components. In association with the present invention, the controller 12 refers to a user command by interfacing with a user, and transmits a recording/reproducing command capable of recording/reproducing data in/from the optical disc to the recording/reproducing unit 20.

The decoder 17 decodes a signal read from the optical disc upon receiving a control signal from the controller 12, restores the decoded signal to desired information, and transmits the restored signal to the user.

The encoder 18 receives a control signal from the controller 12 to record a desired signal in the optical disc, converts the received signal into a specific-format signal (e.g., an MPEG2 transport stream), and transmits the specific-format signal to the signal processor 13.

A method for recording data in the recording medium using the above-mentioned optical recording/reproducing device according to the present invention will hereinafter be described with reference to FIGS. 13~16.

Figure 13:
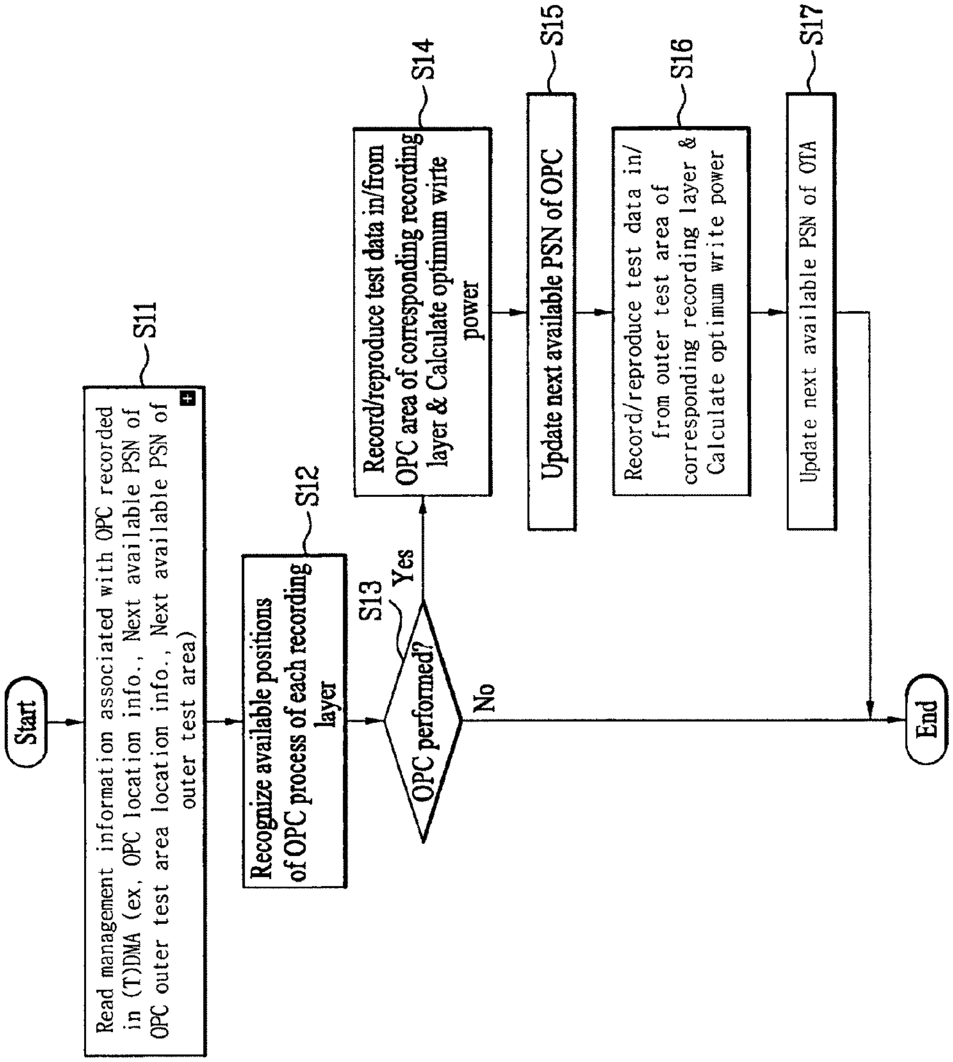
FIGS. 13~16 are flow charts illustrating a method for recording data in a recording medium according to the present invention.

FIG. 13 shows a method for recording data in the recording medium using the optical recording/reproducing device in accordance with a first preferred embodiment of the present invention. Particularly, a method for calculating the optimum write power is shown in FIG. 13.

Referring to FIG. 13, if the optical disc of a physical structure including the OPC area and the outer test area is seated in the optical recording/reproducing device, the microprocessor 16 of the recording/reproducing unit 20 controls operations of the pickup unit 11 using the servo unit 14, it reads OPC-area management information and the outer test-area management information (e.g., "OPC location info", "Next available PSN of OPC", "outer test area location info.", and "Next available PSN of outer test area") recorded in the TDMA or DMA of the seated disc at step S11, and temporarily stores the OPC area management information and the outer test area management information in the memory 15.

The microprocessor 16 recognizes a correct position, at which the OPC process is to be performed, by referring to the above-mentioned management information at step S12. The microprocessor 16 receives a command for performing the OPC process at step S13, and performs the OPC process at the above position recognized by the management information. Particularly, the OPC process is performed in the OPC area and the outer test area, such that an optimum write power to be available for the seated optical disc is calculated at steps S14 and S16. If the optimum write power has been calculated at steps S14 and S16, the microprocessor 16 updates the "next available PSN of OPC" information and the "next available PSN of outer test area" information as the management information associated with the next OPC position at steps S15 and S17.

Particularly, the MSK+HMW modulation method is applied to both the OPC area capable of performing the OPC process and the outer test area, such that ADIP information can be stably read from a groove track. A physical location corresponding to the OPC-area management information and the outer test-area management information is recognized from the read ADIP information at step S12.

Upon receiving a command for recording data in a corresponding disc from the controller 12, the recording/reproducing unit 20 performs the above recording command using the calculated optimum write power, and a detailed description thereof will hereinafter be described with reference to FIG. 14.

Figure 14:
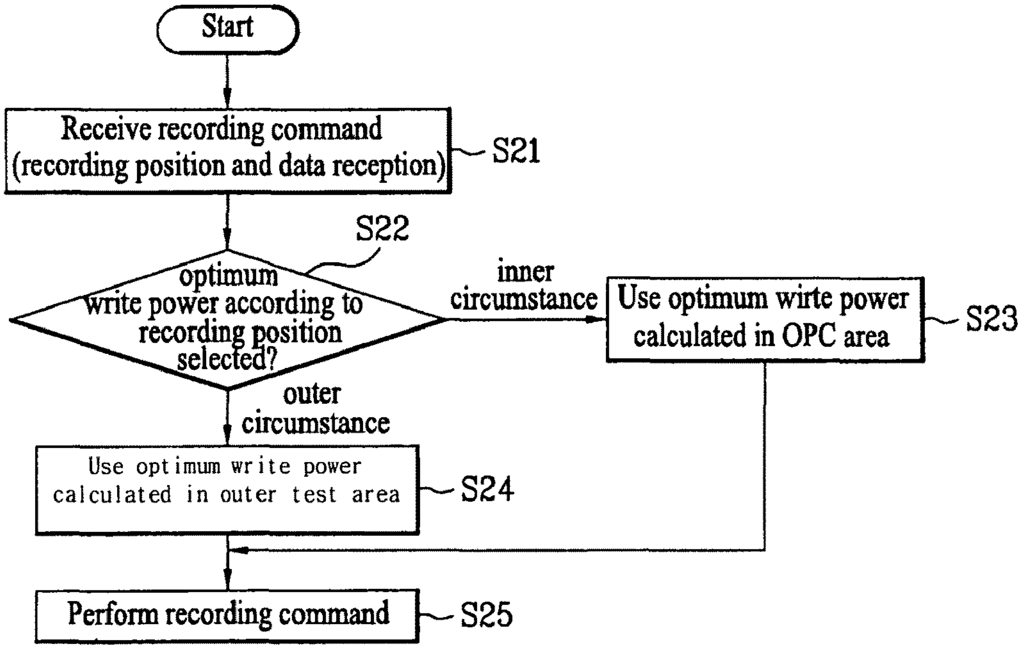

FIG. 14 shows a method for recording data in the recording medium using the optical recording/reproducing device in accordance with a second preferred embodiment of the present invention.

Referring to FIG. 14, the microprocessor 16 contained in the recording/reproducing unit 20 receives a recording command from the controller 12. The recording command is composed of recording data and position information to be recorded in the disc at step S21.

Therefore, the microprocessor 16 selects an optimum write power, at which data is to be recorded, on the basis of recording position information contained in the recording command at step S22. For example, if the recording position is in the vicinity of the inner area of the disc, the microprocessor 16 uses the optimum write power (i.e., the writing power calculated at step S14) calculated at the OPC area at step S23. If the recording position is in the vicinity of the outer area of the disc, the microprocessor 16 uses the optimum write power (i.e., the writing power calculated at step S16) calculated at the outer test area at step S23.

Figure 15:
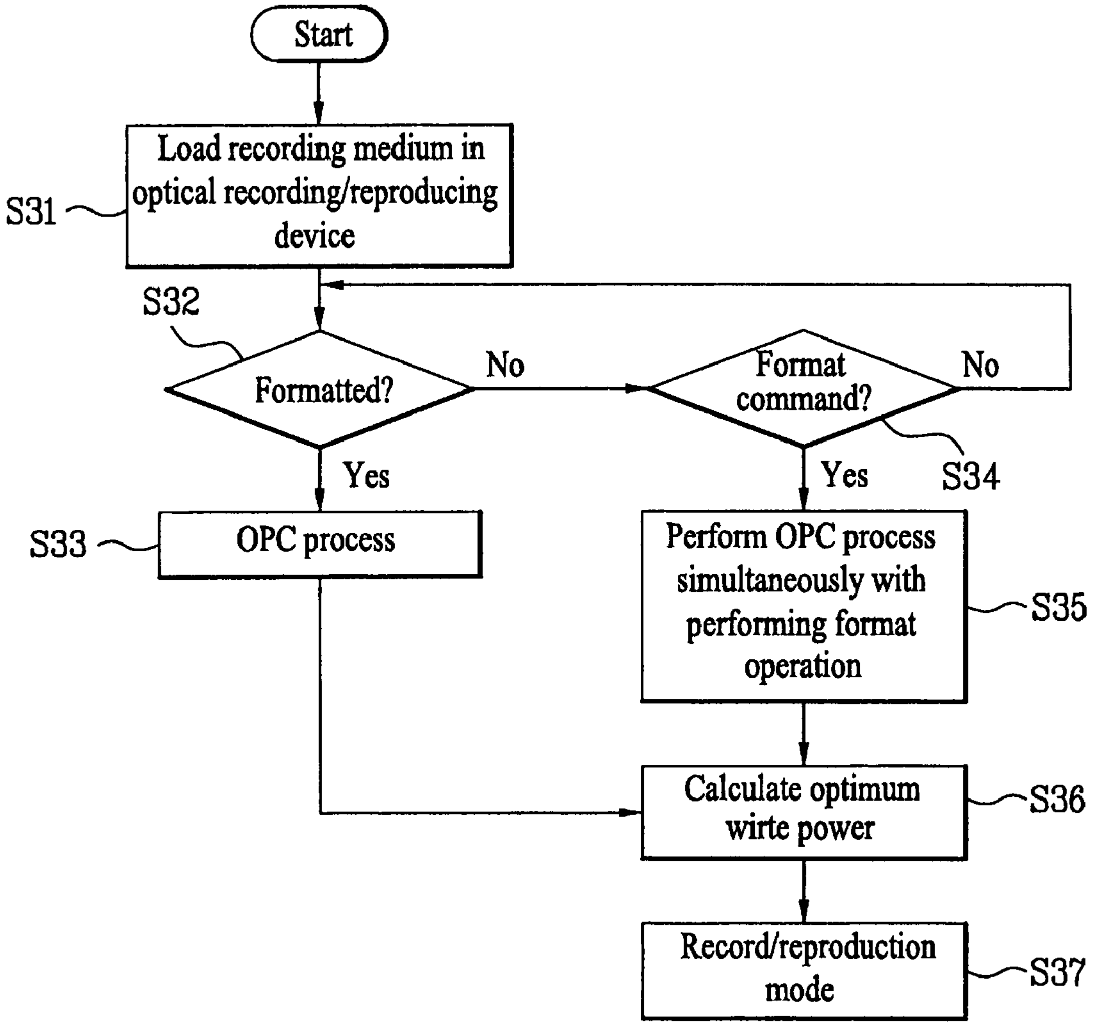

FIG. 15 shows a method for recording data in the recording medium using the optical recording/reproducing device in accordance with a third preferred embodiment of the present invention.

Referring to FIG. 15, if the optical disc of a physical structure including the OPC area and/or the outer test area is seated in the optical recording/reproducing device at step S31, the microprocessor 16 of the recording/reproducing unit 20 contained in the optical recording/reproducing device controls operations of the pickup unit 11 using the servo unit 14, it reads information from the seated optical disc, and determines whether the optical disc is formatted in a disc initialization process at step S32.

If it is determined that the optical disc is formatted at step S32, the microprocessor 16 performs the OPC process to calculate an optimum write power at step S33.

A variety of preferred embodiments associated with a method for performing the OPC process in a dual-layered optical disc composed of two layers "Layer0 (L0)" and "Layer1 (L1)" will hereinafter be described.

According to the first preferred embodiment of the present invention, the OPC process for calculating an optimum write power of the layer L0 is performed using the OPC0 area and the OTA0 area, and at the same time another OPC process for calculating an optimum write power of the layer L1 using the OPC1 area and the OTA1 area is performed. In this case, the controller 12 for receiving a command from the user can determine whether which one of test areas will firstly perform the OPC process.

In other words, according to the above-mentioned first preferred embodiment of the present invention, an optimum write power of the test area is calculated, the calculated information is recorded in the test area, and the calculated optimum write power is used when data is recorded in the data area.

According to a second preferred embodiment of the present invention, the OPC process for calculating an optimum write power is performed using an OPC0 area and a OTA0 area, which act as test areas of the layer L0. Upon receiving a user recording command from the controller 12, the OPC process for calculating an optimum write power when data is recorded in the layer L1 is performed in the OPC1 area acting as a test area of the layer L1 and the OTA1 area.

In this case, the controller 12 for receiving a command from the user can determine whether which one of test areas composed of the OPC0 area and the OTA0 area will firstly perform the OPC process.

According to a third preferred embodiment of the present invention, the OPC process for calculating an optimum write power is performed using both the OPC0 area acting as a test area of the inner area of the optical disc and the OPC1 area acting as a test area of the inner area. Upon receiving a user recording command from the controller 12, the OPC process for calculating an optimum write power when data is recorded in the optical disc is performed in the OTA0 area acting as a test area of the outer area 0 of the optical disc and the OTA1 area acting as a test area of the outer area 1.

In this case, the controller 12 for receiving a command from the user can determine whether which one of test areas composed of the OPC0 area and the OPC1 area will firstly perform the OPC process.

According to a fourth preferred embodiment of the present invention, the OPC process for calculating an optimum write power is performed using the OPC0 area acting as a test area of the inner area of the optical disc. Upon receiving a user recording command from the controller 12, the OPC process for calculating an optimum write power when data is recorded in the optical disc is performed in three areas, i.e., the OTA0 area acting as a test area of the outer area 0 of the optical disc, and the OPC1 and OTA1 areas acting as test areas of the layer L1.

In association with the above-mentioned description, if the optical recording/reproducing device records data in a disc acting as a recording medium according to the second preferred embodiment of the present invention, the layer L0 performs the OPC process to calculate the optimum write power, such that it reads data using the calculated optimum write power according to position information of a data area where data is to be recorded. The layer L1 performs a data record operation according to position information of a data area where data is to be recorded. In more detail, when data is recorded in the vicinity of the inner area of the data area of the optical disc, the layer L1 employs the optimum write power which has been calculated by performing the OPC process in the OPC1 area contained in the inner area 1. When data is recorded in the vicinity of the outer area of the data area of the optical disc, the layer L1 employs the optimum write power which has been calculated by performing the OPC process in the OTA1 area contained in the outer area 1. In this way, the layer L1 can recording data using one of the optimum write powers according to data recording positions.

Although the above-mentioned description uses the second preferred embodiment as an example of various methods capable of performing the OPC process, it is obvious to those skilled in the art that the above-mentioned description can also be applied to other preferred embodiments, i.e., the first preferred embodiment, the third preferred embodiment, and the fourth preferred embodiment.

The method for performing the OPC process when the disc acting as a recording medium is a dual-layered disc has been disclosed in the above-mentioned description. If the above-mentioned disc is a single-layered disc, only one recording layer is used as the recording medium. Therefore, if a first case in which the OPC process is performed in the OPC0 and outer test areas acting as test areas, a second case in which the OPC process is performed in only the OPC0 area, and a third case in which the OPC process is performed in the outer test area require the OPC process during a disc use time, i.e., if a user recording command is received in the dual-layered optical disc, the first case, the second case, and the third case performs the OPC process to calculate an optimum write power when data is recorded in the optical disc.

It is obvious to those skilled in the art that the above-mentioned method for performing the OPC process is applied to at least one layer acting as a recording layer.

Provided that the optical disc has used a test area for a pre-test during the OPC process at step S33, the OPC start position must be detected to perform the OPC process in an unused test area. In this case, it is preferable that the OPC start position be found using the method shown in FIG. 11.

If the disc is not formatted at step S32, the recording/reproducing unit 20 determines the presence or absence of an external format command at step S34.

If the format command is received from the controller 12 at step S34, the recording/reproducing unit 20 performs the OPC process to calculate the optimum write power simultaneously with performing the format process at step S35.

It is preferable that the method for performing the OPC process at step S35 be performed in the same manner as in the above-mentioned preferred embodiments described at step S33.

The method for performing the OPC process simultaneously with performing the format process is described at step S35, such that there is no test for calculating the optimum write power to recording data at step S35. In this case, the OPC process is performed at an available position of the test area.

The OPC process is performed at steps S33 and S35, and the calculated optimum write power is recorded in the test area at step S36.

Therefore, if a user's recording/reproducing command is transmitted to the recording/reproducing unit 20 via the controller 12, the recording/reproducing unit 20 records data in the disc or reproduces information recorded in the disc at step S37.

In association with the above-mentioned description, it is preferable that a test for calculating the optimum write power in only the OPC area be performed in a recording medium including the OPC area other than the outer test area.

Figure 16:
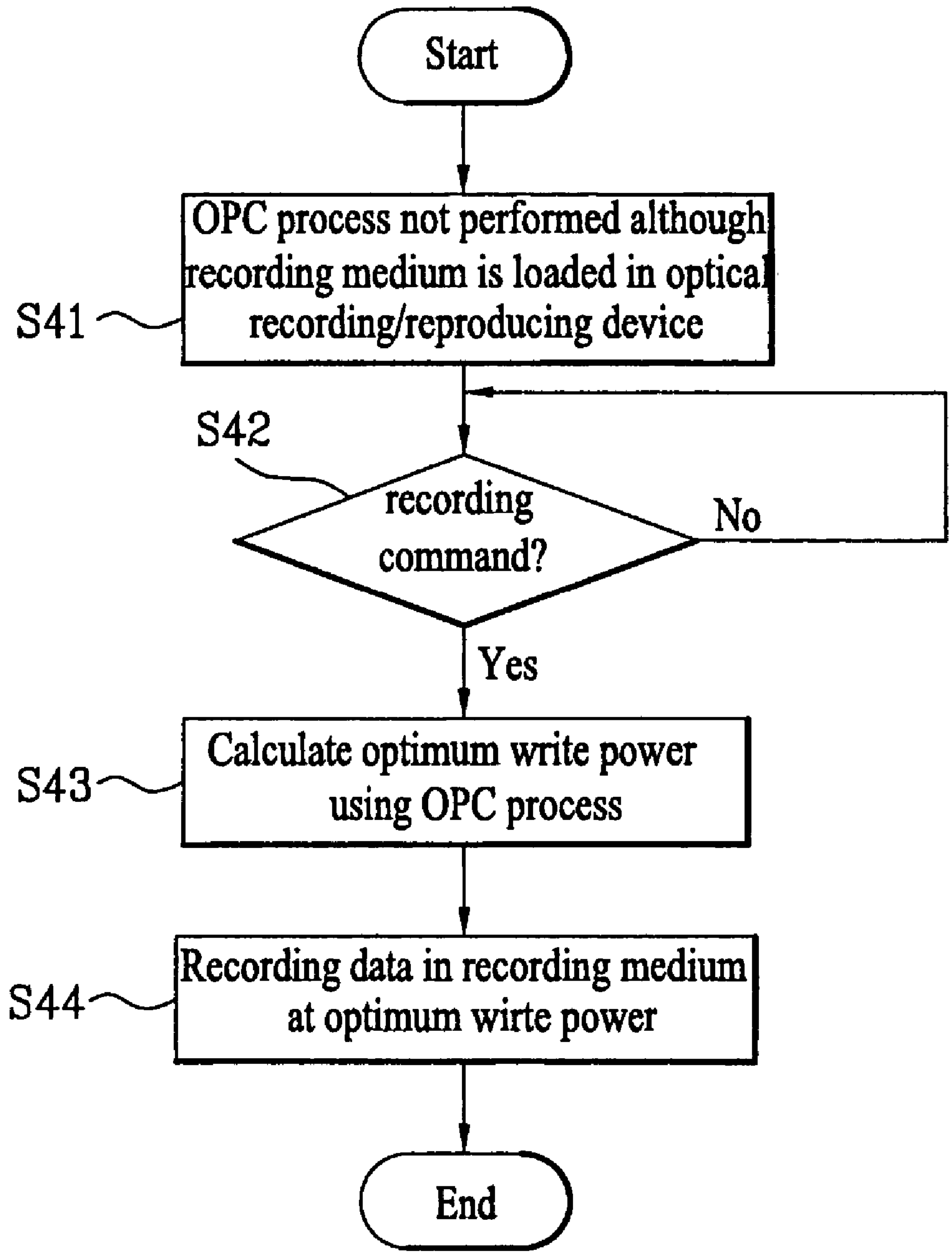

A method for recording data in a recording medium when the optical recording/reproducing device does not immediately perform the OPC process when the optical disc is seated in the optical recording/reproducing device whereas the optical disc has been formatted will hereinafter be described with reference to FIG. 16.

Although the recording medium is seated in the optical recording/reproducing device, the recording/reproducing unit 20 maintains a standby mode without forming the OPC process at step S41.

It is determined whether a recording command is received from the controller 12 when the recording/reproducing unit 20 is in the standby mode at step S42. If it is determined that the recording command has been received from the controller 12 at step S42, the OPC process is performed in the test area to perform a data recording operation, such that an optimum write power is calculated at step S43. The calculated optimum write power is recorded in the test area.

Data suitable for the recording command is recorded in the data area of the recording medium using the calculated optimum write power at step S44.

The present invention uses the optimum write power calculated in the OPC area of the inner area when data is recorded in the vicinity of the inner area of the data area of the disc. When data is recorded in the vicinity of the outer area of the data area of the optical disc, the present invention uses the optimum write power calculated in the outer test area of the outer area. Therefore, the present invention can properly use the optimum write power according to data recording positions.

In other words, the first optimum write power applied in the vicinity of the inner area of the disc is acquired by the result calculated in the OPC area, and the second optimum write power applied in the vicinity of the outer area of the disc is acquired by the result calculated in the outer test area, resulting in the prevention of a data recording error. In this case, the data recording error may occur when the same writing power is applied to overall data areas during a predetermined data recording time during which data is recorded in a high-density disc such as a BD at high speed.

For another example, the first optimum write power calculated in the OPC area and the second optimum write power calculated in the outer test area are not used in the example without any change, but individual weights are applied to the first and second optimum write powers according to data recording positions to determine the last writing power. Otherwise, if the data recording position is in the vicinity of the center part of the data area, a mean value of the calculated optimum write powers can also be applied to the present invention.

As apparent from the above description, a physical structure including the OPC area and the outer test area of a recording medium, and a method and apparatus for recording/reproducing data in/from the recording medium using the physical structure according to the present invention can be applied to a method for manufacturing a BD recently developed, and can effectively record/reproduce data in/from the disc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium including at least two layers, each of which includes an inner area, a data area, and an outer area, comprising:

a first layer having at least a first test area contained in the inner area, and a third test area and a first protection area contained in the outer area; and a second layer having at least a control data area contained in the inner area, a second test area and a second protection area contained in the outer area, wherein the inner area is physically separate from the outer area, the first, second and third test areas are formed by a predetermined wobble modulation method equal to that of the data area, the modulation method for use in the first, second and third test areas and the data area is indicative of both an MSK (Minimum Shift Keying) wobble modulation method and HMW (Harmonic Modulated Wave) modulation method, and only an MSK (Minimum Shift Keying) modulation method is applied to the first and second protection area, and the control data area is embossed in the form of wobbles, wherein the control data area in the second layer overlaps with the first test area in the first layer with respect to the incident beam, and the second test area in the second layer overlaps with the third test area in the first layer with respect to the incident beam.

2. The recording medium according to claim 1, wherein the first, second and third test areas are used for an Optimum Power Control (OPC).

3. The recording medium according to claim 1, wherein the first, second and third test areas contain an address information modulated in the wobble by the predetermined wobble modulation method.

4. The recording medium according to claim 1, wherein the first, second and third test areas contain ADIP (Address In Pre-groove) unit modulated in the wobble by the predetermined wobble modulation method.

5. The recording medium according to claim 1, wherein at least one of the inner area and the outer area further includes a management information area storing management information for managing the first, second and third areas.

6. The recording medium according to claim 5, wherein the management information further includes first position information indicating a position of the first, second and third test areas in the recording medium.

7. The recording medium according to claim 5, wherein the management information includes second position information indicating an available position in each test area.

8. The recording medium according to claim 1, wherein the second test area is used for Optimum Power Control (OPC) at a different direction from a progression direction of an optical beam.

9. The recording medium according to claim 8, wherein the first test area is used for OPC at different direction from progression direction of an optical beam.

10. The recording medium according to claim 8, wherein the OPC is performed by a predetermined unit, and a test data for OPC is written in the predetermined unit at a same direction as progression direction of an optical beam.

11. The recording medium according to claim 8, wherein the OPC is performed at a variable length, and a boundary between a used test portion and unused test portion within first data unit are indicated by a marker information.

12. The recording medium according to claim 11, wherein the first data unit is a physical cluster.

13. A method of recording data in a recording medium including at least a first layer and a second layer, each of which includes an inner area, a data area and an outer area, the first layer having at least a first test area contained in the inner area, and a third test area and a first protection area contained in the outer area, the second layer having at least a control data area contained in the inner area, a second test area and a second protection area contained in the outer area, comprising the steps of:

(a) reading position information indicating an available position in at least one of the first, second and third test areas, the position information being included in management information recorded in the recording medium, and recognizing a physical position corresponding to the read position information;

(b) performing an Optimum Power Control (OPC) process for determining an optimum write power in the recognized available area; and (c) recording data using the determining optimum write power, wherein the first, second and third test areas are formed by both an MSK (Minimum Shift Keying) wobble modulation method and HMW (Harmonic Modulated Wave) wobble modulation method, the modulation method of the first, second and third test areas are same as that of the data area, and only an MSK (Minimum Shift Keying) modulation method is applied to the first and second protection areas, and the control data area is embossed in the form of wobbles, and wherein the control data area in the second layer overlaps with the first test area in the first layer with respect to the incident beam, and the second test area in the second layer overlaps with the third test area in the first layer with respect to the incident beam.

14. The method according to claim 13, wherein the step (a) recognizes the available area corresponding to the read position information using an address information modulated in the wobble by both the MSK (Minimum Shift Keying) wobble modulation method and HMW (Harmonic Modulated Wave) wobble modulation method.

15. The method according to claim 13, wherein the step (b) performs the OPC process by unit of a predetermined size.

16. The method according to claim 15, wherein the unit of predetermined size is smaller than physical cluster.

17. The method according to claim 16, wherein the unit is AUN (Address Unit Number) unit, and wherein a plurality of AUNs comprise one physical cluster.

18. The method according to claim 13, wherein the step (a) further includes a step of reading second position information indicating a position of the first, second and third test areas assigned to the recording layer and recognizing a position of the first, second and third test areas.

19. The method according to claim 15, wherein the step (b) includes a step of searching a start position for the OPC process, the start position being varied depending on the number of units, and then performs the OPC process from the start position.

20. The method according to claim 19, wherein the start position is searched by counting a wobble.

21. An apparatus for recording data in a recording medium including at least a first layer and a second layer, each of which includes an inner area, a data area and an outer area, the first layer having at least a first test area contained in the inner area, and a third test area and a first protection area contained in the outer area, the second layer having at least a control data area contained in the inner area, a second test area and a second protection area contained in the outer area, comprising:

a pickup unit configured to read data recorded in the recording medium, the data including position information indicating an available position in at least one of the first, second and third test areas, the position information being included in management information recorded in the recording medium, and configured to record data; and a controller configured to control to recognize a physical position corresponding to the position information read from the pickup unit, configured to control to search an optimum write power by performing an Optimum Power Control (OPC) process in the recognized available area, and configured to control the pickup unit to record data in the recording medium using the searched optimum write power, wherein the first, second and third test areas are formed by both an MSK (Minimum Shift Keying) wobble modulation method and HMW (Harmonic Modulated Wave) wobble modulation method, the modulation method of the first, second and third test areas are same as that of the data area, and only an MSK (Minimum Shift Keying) modulation method is applied to the first and second protection areas, and the control data area is embossed in the form of wobbles, and wherein the control data area in the second layer overlaps with the first test area in the first layer with respect to the incident beam, and the second test area in the second layer overlaps with the third test area in the first layer with respect to the incident beam.

22. The apparatus according to claim 21, wherein the controller is configured to recognize the available area corresponding to the read position information using an address information modulated in the wobble by both the MSK (Minimum Shift Keying) wobble modulation method and HMW (Harmonic Modulated Wave) wobble modulation method.

23. The apparatus according to claim 21, wherein the OPC process is performed by unit of a predetermined size.

24. The apparatus according to claim 23, wherein the total size for performing the OPC process is variable.

25. The apparatus according to claim 23, wherein the controller is configured to search a start position for the OPC process, the start position being varied depending on the number of units.

26. The apparatus according to claim 25, wherein the controller is configured to search the start position by counting a wobble.

27. The apparatus according to claim 21, wherein the controller is configured to control the pickup unit to read second position information indicating a position of the first, second and third test areas assigned to the recording layer, and is configured to recognize a position of the first, second and third test areas.

* * * * *